Figure 1:
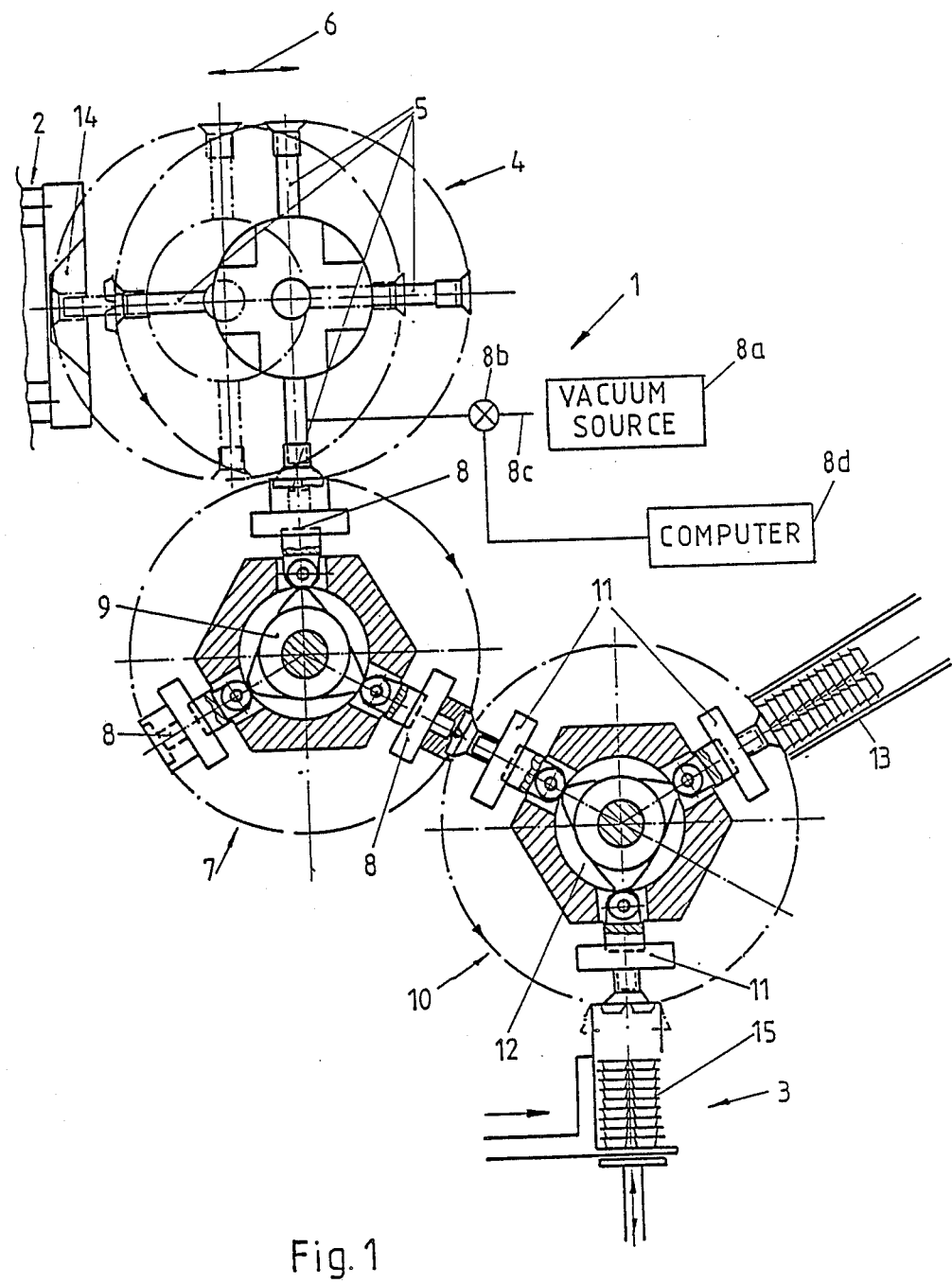

United States Patent [19]

Kaplan et al.

[11] Patent Number: 4,874,076

[45] Date of Patent: Oct. 17, 1989

[54] DEVICE FOR TRANSFERRING PACKAGES

[75] Inventors: Horst Kaplan; Gerhard Grube, both of Bielefeld, Fed. Rep. of Germany

[73] Assignee: Otto Hänsel GmbH, Hanover, Fed. Rep. of Germany

[21] Appl. No.: 273,174

[22] Filed: Nov. 14, 1988

Related U.S. Application Data

[63] Continuation of Ser. No. 52,696, May 21, 1987, abandoned.

[30] Foreign Application Priority Data

May 22, 1986 [DE] Fed. Rep. of Germany ....... 3617259

[51] Int. Cl.⁴ .............................................. B65G 29/00
[52] U.S. Cl. .................................... 198/370; 198/347; 198/358; 414/225; 414/737
[58] Field of Search ............... 414/223, 224, 225, 737; 198/347, 471.1, 356, 358, 366, 370, 524; 221/95, 114, 223, 307, 310; 53/54, 77, 493, 494

[56] References Cited

U.S. PATENT DOCUMENTS

| | | | |
|---|---|---|---|
| 3,517,477 | 6/1970 | Thornton | 198/356 X |
| 3,834,522 | 9/1974 | Jackson | 414/744 BX |
| 3,939,984 | 2/1976 | Butner et al. | 198/356 X |
| 4,033,478 | 7/1977 | House | 221/310 X |
| 4,045,944 | 9/1977 | Giori | 53/520 |
| 4,172,515 | 10/1979 | Wochnowski | 198/524 |
| 4,238,025 | 12/1980 | Manservisi | 198/370 |
| 4,626,167 | 12/1986 | Bond et al. | 414/752 X |

Primary Examiner—Robert J. Spar
Assistant Examiner—Donald W. Underwood
Attorney, Agent, or Firm—Max Fogiel

[57] ABSTRACT

Method of and device for transferring packages like bags, blister packs, etc. from a packaging machine to a further-processing mahcine, a box-packing machine for example, wherein a small portion of the packages released by the packaging machine are automatically transferred to a supply shaft by a transfer device and most of the packages are provided to the downstream further-processing machine by the transfer device, whereby the packages diverted upstream of the transfer device are replaced with packages obtained from the supply shaft by the transfer device.

10 Claims, 4 Drawing Sheets

DEVICE FOR TRANSFERRING PACKAGES

This application is a continuation of parent application Ser. No. 052,696 filed May 21, 1987, now abandoned.

The instant invention concerns a method of and a device for transferring packages like bags, blister packs, etc. from a packaging machine to a box-packing machine.

Transferring a package, usually a blister pack from a packaging machine to a compartment in a chain conveyor is known. The package is previously tested, and defective packages or packages that are not completely full are diverted, in which case the corresponding compartment of the the conveyor remains empty. To ensure accordingly that the box being packed will contain the correct number of packages an additional hollow shaft for feeding further packages in is provided. The empty compartments in the conveyor are supplied from this supplementary supply shaft. The supplementary shaft has to be stocked by hand and restocked from time to time during the operation of the device.

The object of the invention is accordingly to provide a method and a device wherein the transfer of packages from a packaging machine to a further-processing machine will be completely automated, wherein the supply shaft does not have to be stocked or emptied by hand, and wherein the time-consuming processes of compensating for any absent packages will be unnecessary.

This object is attained in accordance with the invention in a method wherein packages like bags, blister packs, etc. are transferred from a packaging machine to a further-processing machine, a box-packing machine for example, in that a small portion of the packages released by the packaging machine are automatically transferred to a supply shaft by a transfer device and defective and diverted packages are replaced with packages obtained from the supply shaft by the transfer device. This method ensures that the packages will be transferred from the packaging machine to the further-processing machine completely automatically with no necessity for manual labor, like compensating for missing packages for example.

At the commencement of operations a particular number of packages can be automatically stocked in the supply shaft such that diverted packages can be replaced with packages from the shaft. The shaft will accordingly have to be restocked automatically only when it is empty or when the number of packages in it drops below a prescribed minimum. The supply shaft is restocked automatically and only when necessary, so that a high packing output is attained.

Periods during which either the further-processing machine or the packaging machine is off can also be exploited to restock the supply shaft. This makes it possible to compensate for downtimes and keep the periods needed for restocking the supply shaft as short as possible. Furthermore, it is possible to automatically empty the shaft upon termination of operations. This is especially practical when different products are to be processed one after another. The transfer device will preferably be designed such that the opening that packages are supplied to or removed from a supply shaft through is positioned in the path of conveyance of the transfer device's gripper. The supply shaft can accordingly be stocked and emptied by the transfer device in a simple way. The grippers preferably consist of suction plungers that can grip the packages independent of their outer shape and size. The requisite vacuum will be established and disestablished separately for each suction plunger by means of associated valves. The valves will preferably be controlled by a computer. It will accordingly be unnecessary to vary the synchronization of the transfer device, the packaging machine, or the further-processing machine. The throughput can accordingly be extremely rapid. The suction plungers are in a practical way mounted on revolving rotors such that the packages can be transferred from one rotor to the next as they are advanced. The last rotor transfers the packages to the further-processing machine and simultaneously communicates with the supply shaft. Missing packages can accordingly be obtained from the shaft. Since the suction plungers execute a radial motion as they revolve, they can for example enter the supply shaft, pick up a package, and exit the shaft. The radial motion is controlled by a rotating camshaft inside the rotors. Since the rotors themselves can accordingly rotate intermittently, they will pause briefly while picking up a package.

The particular advantage of the overall system is that it is extraordinarily short and takes up very little space. No downstream units, to replenish missing packages for instance, are necessary. Missing packages are automatically replenished and the supply shaft that does so is itself automatically restocked when necessary. Since the machines do not need to be resynchronized during operation, as would be necessary if missing packages had to be replaced, the packing rate will be very high.

One embodiment of the invention will now be specified in the following description with reference to the attached drawings, wherein FIG. 1 is a side view of the transfer device in accordance with the invention along with its associated supply shaft and FIGS. 2 through 12 are similar side views of the device illustrated in FIG. 1 at various stages of operation.

FIG. 1 is a side view of a transfer device 1. A package is released by a packaging machine 2 that is not illustrated in detail. The package is transferred to a box-packing machine 3 that is also not illustrated in detail. Machines 2 and 3 are essentially of known designs and accordingly need no further specification. They must, however be synchronized, and the synchronization must remain constant throughout the operation.

Transfer device 1 has an unillustrated frame. A rotating pickup 4 is provided in the frame at the end of packaging machine 2. Pickup 4 has four suction plungers 5 distributed around it at angles of 90°. In addition to its rotation, pickup 4 also carries out a horizontal motion in the direction indicated by arrow 6.

A rotor 7 is also mounted in the machine frame below pickup 4. Distributed around its circumference at angles of 120° are three suction plungers 8 that can move in and out radially. The radial motion is controlled by means of a camshaft 9 inside rotor 7.

Another rotor 10 is positioned at one side of the frame and below rotor 7. Second rotor 10 rotates in the opposite direction from first rotor 7. Second rotor 10 also has three radially movable suction plungers 11 distributed around it at angles of 120°. Suction plungers 11 are controlled by another camshaft 12 inside second rotor 10. Rotors 7 and 10 are essentially different in design.

Further-processing machine 3 and a hollow supply shaft 13 are located in the vicinity of second rotor 10.

The hollow shaft that box-packing machine 3 is supplied from is at an angle of 120° to supply shaft 13.

Suction plungers 5, 8, and 11 communicate separately with vacuum lines in a way that is in itself known and are controlled by means of valves. In FIG. 1 only plunger 8 is shown to communicate with vacuum source 8a by vacuum line 8c through valve 8b controlled by a computer 8d.

How transfer device 1 operates will now be specified. FIGS. 2 through 12 illustrate the device at various stages that can occur in operation.

Figure 2:
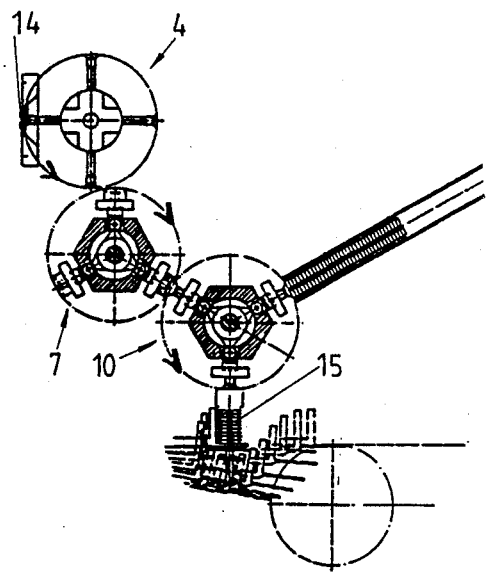
Figure 3:
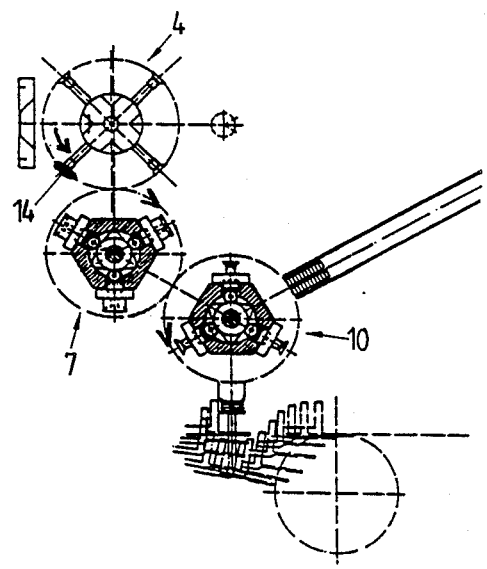
Figure 4:
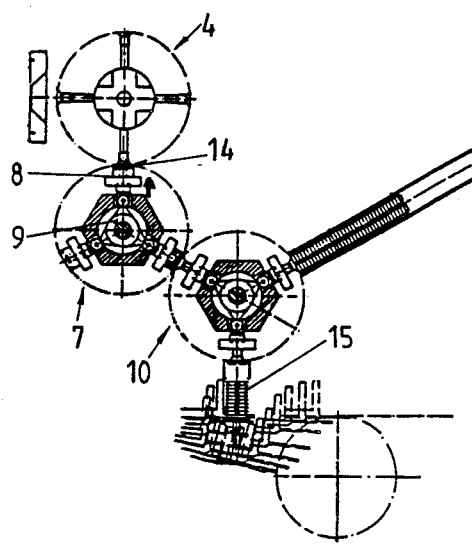
Figure 5:
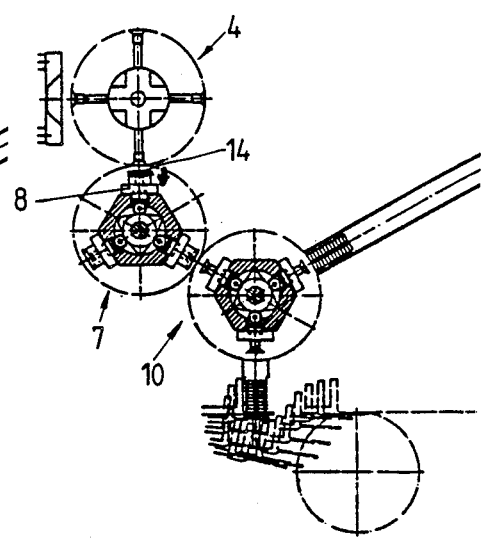
Figure 6:
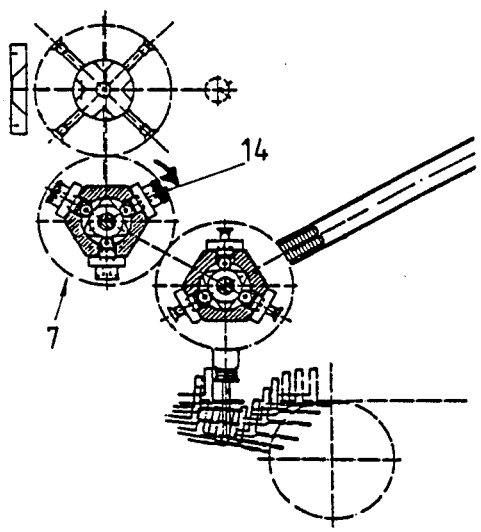
Figure 7:
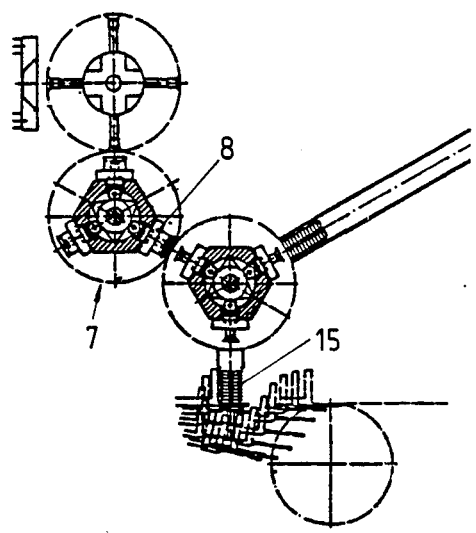
Figure 8:
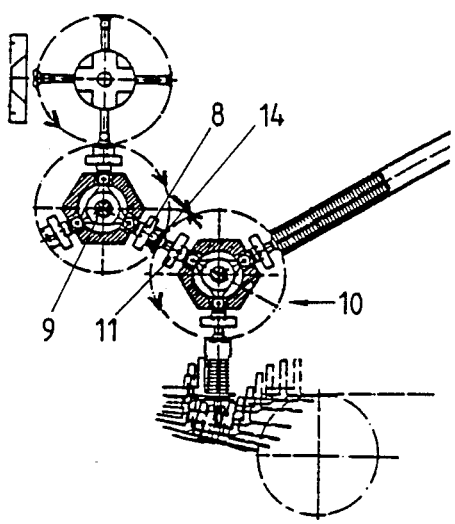
Figure 9:
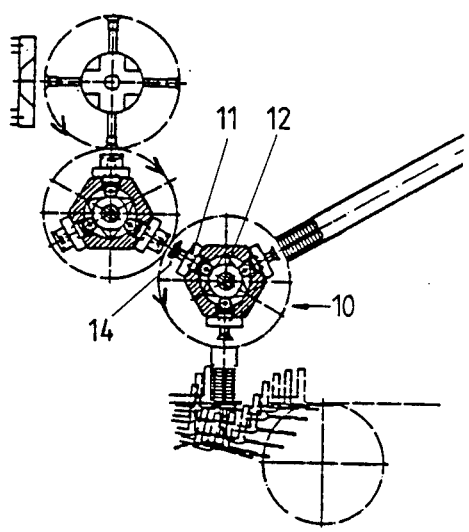
Figure 10:
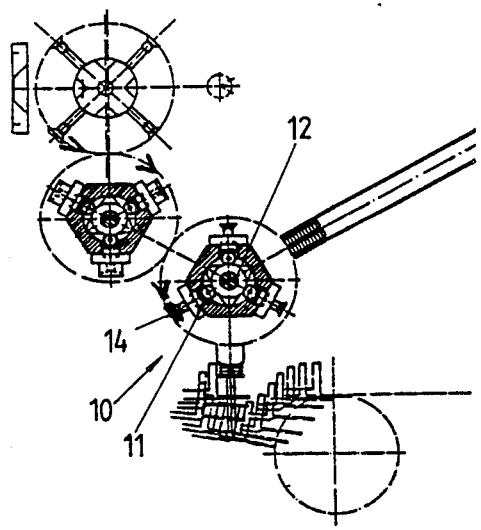
Figure 11:
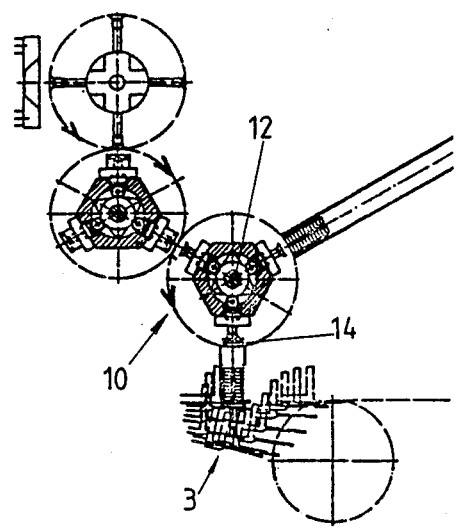
Figure 12:
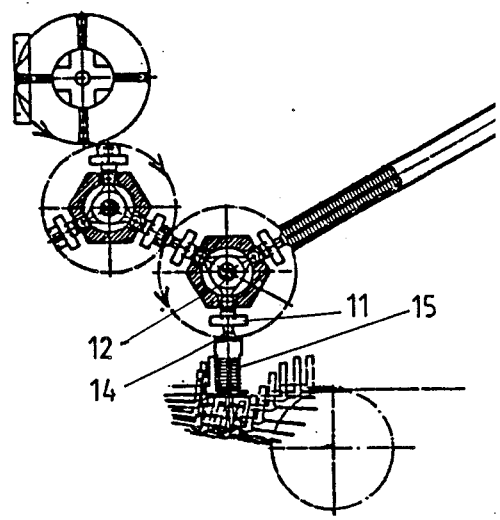

A package 14 is released by packaging machine 2 and, as illustrated in FIG. 2, grasped by one of the suction plungers 5 in pickup 4. Pickup 4 then rotates counterclockwise and to the right in the direction indicated by arrow 6 in FIG. 3. Once pickup 4 arrives at the position illustrated in FIG. 4, once it has rotated 90° that is, package 14 is transferred to a suction plunger 8 on first rotor 7, which has been advance by first camshaft 9. As camshaft 9 rotates, the plunger is retracted along with package 14 as illustrated in FIG. 5. First rotor 7 then rotates clockwise as illustrated in FIG. 6 until it arrives at the position illustrated in FIG. 7. Suction plunger 8 is now in the retracted position and is now advanced out by camshaft 9 as illustrated in FIG. 8. In this position package 14 is transferred to suction plunger 11, which is in the outward position illustrated in FIG. 8. Plunger 11 is now retracted by the rotating camshaft 12, with second rotor 10 rotating 120° counterclockwise. This process involves traveling through the positions illustrated in FIGS. 9, 10, and 11. The suction plunger 11 with package 14 is now above the box-packing machine and in its retracted position. Camshaft 12 rotates, advancing plunger 11 out and depositing package 14 in a box 15 in the box-packing machine. The operation can now commence from the beginning. When, now, the packaging machine releases a defective package, the package is rejected by the pickup before it arrives at the suction plunger 8 on first rotor 7. Another package 14 is instead obtained from supply shaft 13 by a suction plunger 11 on second rotor 10. Transfer device 1 is at that point in the position illustrated in FIG. 4, with the rest of the process corresponding to that already described herein. The defective package is accordingly replaced with another one from the supply shaft with no need to stop the device. The throughput is accordingly not decreased.

Supply shaft 13 is also stocked automatically, with the foregoing procedure essentially still occurring. The package, however, is not in this case deposited in box-packing machine 3 but continues on with second rotor 10 and is forced into supply shaft 13 by a suction plunger 11.

The operational stages just described are controlled by means of unillustrated valves in the vacuum lines leading to the suction plungers. The valves themselves are controlled in a practical way by a computer. The transfer device can accordingly be adapted in a simple way to various operating conditions. Thus, the supply shaft can initially be automatically stocked with a prescribed number of packages at the commencement of operations. The shaft can also be automatically emptied at the end of operations as is necessary in particular when changing over to another product. The shaft is restocked during operation as soon as the number of packages therein drops below a prescribed minimum. All of these processes are completely automatic and demand no manual intervention at any point.

We claim:

1. Apparatus for transferring package articles from an article packaging machine to a box-packing machine, comprising: storage means for storing a predetermined supply of said packaged articles in a supply shaft; transfer means for transferring packaged articles from said packaging machine directly to said box-packing machine; means for diverting defectively packaged articles away from said box-packing machine so that defectively packaged articles do not reach said box-packing machine; means for replacing the defectively packaged article directly with a packaged article from said supply shaft in said storage means without interrupting the flow of packaged articles to said box-packing machine; said transfer means transferring the packaged article from said supply shaft to said box-packing machine at a location in substantially close proximity to said box-packing machine for replacing said defectively packaged article, said packaging machine being substantially distant from said box-packing machine compared to the distance between said supply shaft and said box-packing machine; said transfer means having a gripper for picking up and advancing packaged articles leaving said article packaging machine; said supply shaft having an opening for the passage of articles to said supply shaft and from said supply shaft, said opening being positioned in a path of conveyance of said gripper.

2. Apparatus as defined in claim 1, wherein said opening is the same opening for packaged articles entering said supply shaft and leaving said supply shaft.

3. Apparatus as defined in claim 1, wherein said gripper has suction plungers.

4. Apparatus as defined in claim 3, including revolving rotors for mounting said suction plungers.

5. Apparatus as defined in claim 4, wherein said rotors comprise a plurality of similar rotors mounting said suction plungers at predetermined angles of 120° apart.

6. Apparatus as defined in claim 5, wherein said opening and station at which said packaged articles are transferred to said box-packing machine are located in vicinity of a rotor.

7. Apparatus as defined in claim 4, wherein said suction plungers are mounted on said rotors so that said suction plungers can execute radial motion.

8. Apparatus as defined in claim 7, including a rotating cam shaft positioned inside each of said rotors for moving said suction plungers radially.

9. Apparatus as defined in claim 3, wherein each suction plunger is supplied with vacuum individually and independently of other plungers.

10. Apparatus as defined in claim 9, including a vacuum source and vacuum line connected to said suction plungers; valve means in said vacuum line; and computer means for controlling said valve means.

* * * * *